(12) United States Patent
Kim (10) Patent No.: US 11,232,528 B2
(45) Date of Patent: Jan. 25, 2022

(54) SERVICE REQUEST DEVICE AND METHOD

(71) Applicant: HELLOFACTORY CO., LTD., Seoul (KR)

(72) Inventor: Kyungmin Kim, Seoul (KR)

(73) Assignee: HELLOFACTORY CO., LTD., Seoul (KR)

( * ) Notice: Subject to any disclaimer, the term of this patent is extended or adjusted under 35 U.S.C. 154(b) by 59 days.

(21) Appl. No.: 16/669,565

(22) Filed: Oct. 31, 2019

(65) Prior Publication Data

US 2020/0219209 A1 Jul. 9, 2020

(30) Foreign Application Priority Data

Jan. 7, 2019 (KR) ........................ 10-2019-0001687

(51) Int. Cl.
*G06Q 30/02* (2012.01)
*G06Q 50/12* (2012.01)

(52) U.S. Cl.
CPC ......... *G06Q 50/12* (2013.01); *G06Q 30/0281* (2013.01)

(58) Field of Classification Search
CPC ........................ G06Q 50/12; G06Q 30/0281
See application file for complete search history.

(56) References Cited

U.S. PATENT DOCUMENTS

| | | | | |
|---|---|---|---|---|
| 6,636,835 B2 * | 10/2003 | Ragsdale-Elliott | .... | G06Q 20/20 705/15 |
| 6,681,109 B1 * | 1/2004 | Leifer | .................. | G06F 1/1626 455/414.1 |
| 6,973,437 B1 * | 12/2005 | Olewicz | .................. | G06Q 30/02 705/15 |
| 6,975,207 B1 * | 12/2005 | Shmelzer | ........... | G06Q 30/0601 340/10.6 |
| 7,257,547 B1 * | 8/2007 | Terase | .................. | G06Q 10/087 705/15 |
| 9,098,985 B2 * | 8/2015 | Hetterly | .................. | G08B 7/068 |
| 2003/0088469 A1 * | 5/2003 | Leifer | .................. | G06F 1/1698 705/15 |
| 2004/0068441 A1 * | 4/2004 | Werbitt | .................. | H04W 4/029 705/16 |
| 2004/0158865 A1 * | 8/2004 | Kubler | ............. | H04N 21/41415 725/82 |
| 2005/0273345 A1 * | 12/2005 | Romero | .................. | G06Q 50/12 705/15 |
| 2008/0114694 A1 * | 5/2008 | Hamdane | ........... | G06Q 30/0601 705/59 |
| 2008/0243624 A1 * | 10/2008 | Perry | .................... | G06F 1/1688 705/15 |
| 2008/0288357 A1 * | 11/2008 | Stambaugh | ............ | G06Q 10/06 705/15 |

(Continued)

FOREIGN PATENT DOCUMENTS

KR    10-2016-0050243    5/2016

*Primary Examiner* — Nay Tun
(74) *Attorney, Agent, or Firm* — Ladas & Parry, LLP (57) ABSTRACT

Provided is a service request device including a display which includes an information display unit and an electronic code display unit, a button, and a processor which transmits a call signal corresponding to at least one of an input, information corresponding to an electronic code displayed on the information display unit, and an electronic code displayed on the electronic code display unit when the input to the button is received.

12 Claims, 7 Drawing Sheets

(56) References Cited

U.S. PATENT DOCUMENTS

| | | | |
|---|---|---|---|
| 2009/0171790 A1* | 7/2009 | Nagarajayya | G06Q 40/12 705/14.61 |
| 2010/0106607 A1* | 4/2010 | Riddiford | G06Q 30/0603 705/15 |
| 2012/0095822 A1* | 4/2012 | Chiocchi | G06Q 30/0207 705/14.26 |
| 2013/0191229 A1* | 7/2013 | Rodgers | G06Q 30/06 705/15 |
| 2013/0334308 A1* | 12/2013 | Priebatsch | G06Q 90/00 235/383 |
| 2014/0025513 A1* | 1/2014 | Cooke | G06Q 20/20 705/17 |
| 2015/0026229 A1* | 1/2015 | Chung | H04L 67/02 709/201 |
| 2015/0294344 A1* | 10/2015 | Popomaronis | G06Q 30/0235 705/14.35 |
| 2017/0017263 A1* | 1/2017 | Birgeoglu | G06Q 20/18 |
| 2017/0083096 A1* | 3/2017 | Rihn | G06F 3/0416 |
| 2017/0098264 A1* | 4/2017 | Priebatsch | G06Q 20/3224 |
| 2017/0109843 A1* | 4/2017 | Berg | G06Q 20/326 |
| 2017/0316626 A1* | 11/2017 | Smith | G07C 9/257 |
| 2019/0141021 A1* | 5/2019 | Isaacson | G06Q 50/01 |
| 2020/0202363 A1* | 6/2020 | Sawa | G06Q 10/10 |
| 2021/0049858 A1* | 2/2021 | Huntley | G06Q 10/04 |

* cited by examiner

FIG. 8

SERVICE REQUEST DEVICE AND METHOD

CROSS REFERENCE TO RELATED APPLICATION(S)

This application claims the priority to Korean Patent Application No. 10-2019-0001687, filed on Jan. 7, 2019, which is all hereby incorporated by reference in its entirety.

BACKGROUND

Technical Field

The present disclosure generally relates to a service request device and method.

Related Art

A service request device is provided on each table in a restaurant or the like. When a user presses a call bell button, the service request device is configured to transmit the corresponding table number to a restaurant manager.

However, there is a problem in that the existing service request device cannot transmit any information other than the table number to the restaurant manager, and cannot provide special information to users of each table.

Therefore, there is a need to develop a service request device which can improve the problem of the existing service request device and provide more efficient restaurant management and better services

RELATED ART DOCUMENT

Patent Document

Korean Patent Laid-Open Publication No. 10-2016-0050243 published on May 11, 2016.

SUMMARY

Various embodiments of the present disclosure provide a service request device.

The technical objects of the present invention are not limited to the above-mentioned technical objects, and other technical objects that are not mentioned will be clearly understood by those skilled in the art through the following descriptions.

In an aspect, a service request device includes: a display which includes an information display unit and an electronic code display unit; a button; a communication unit; a real time clock (RTC); and a processor, in which the processor transmits a call signal corresponding to at least one of an input, information corresponding to an electronic code displayed on the information display unit, and an electronic code displayed on the electronic code display unit, when the input to the button is received, perform time synchronization with an external server based on the RTC, and generates the electronic code at a predetermined time interval based on the synchronized time information.

The processor may regenerate and display the electronic code when photographing information of the electronic code is received.

The display may display the electronic code including link information corresponding to the information displayed on the information display unit on the electronic code display unit.

The display may display an electronic code corresponding to a predetermined payment system on the electronic code display unit and display information on the payment system on the information display unit.

The button may include a plurality of input regions and a plurality of sensor units, and the processor may determine a location, a range, and strength where the button is pressed based on the plurality of input regions and the plurality of sensor units and generate different call signals using the determination result.

The processor may determine the strength where the button is pressed as first strength to fourth strength using the plurality of sensor units, determine urgency of the call signal based on the determined strength, and transmit the call signal including information on the determined urgency.

The processor may acquire information on a previous order menu of the user, acquire information on at least one ordering menu belonging to a first category among the previous ordering menus based on a database, display a message querying whether to reorder the at least one ordering menu on the display when an input of a user to the button is received, and transmit a call signal including reordering information of the at least one ordering menu when a re-input of the user to the button is received within a predetermined time, the database may include information classifying a plurality of ordering menus into a plurality of categories, and the plurality of categories may include a first category in which a possibility of reordering is equal to or greater than a predetermined reference value and a second category in which a possibility of reordering is equal to or smaller than a predetermined reference value.

The service request device may further include: at least one light emitting unit, in which the processor may perform control to receive a feedback signal corresponding to the transmitted call signal and display a light emission signal corresponding to the feedback signal through the light emitting unit.

The communication unit may perform communication with a computer, a user terminal, and an external server using at least one of low power Bluetooth communication and Wi-Fi communication, and the processor may control the display to receive an image to be displayed on the information display unit from the external server through the communication unit and display the received image, and the image may be at least one of in-store advertisement of notice, event, promotion and the like.

The processor may determine a set value of the service request device at a predetermined time interval, receive a set value instruction of the service request device, and change setting of the service request device based the received instruction.

Other specific details of the invention are contained in the detailed description and drawings.

DESCRIPTION OF EXEMPLARY EMBODIMENTS

Advantages and features of the present invention and methods to achieve them will be elucidated from exemplary embodiments described below in detail with reference to the accompanying drawings. However, the present invention is not limited to the embodiments disclosed herein, but will be implemented in various forms. The embodiments make disclosure of the present invention thorough and are provided so that those skilled in the art can easily understand the scope of the present invention. Therefore, the present invention will be defined by the scope of the appended claims.

Terms used in the present specification are for explaining the embodiments rather than limiting the present invention. Unless specifically mentioned otherwise, a singular form includes a plural form in the present specification. Throughout this specification, the term "comprise" and/or "comprising" will be understood to imply the inclusion of stated constituents but not the exclusion of any other constituents. Like reference numerals refer to like elements throughout the specification and "and/or" includes each of the components mentioned and includes all combinations thereof. Although "first", "second" and the like are used to describe various components, it goes without saying that these components are not limited by these terms. These terms are used only to distinguish one component from other components. Therefore, it goes without saying that the first component mentioned below may be the second component within the technical scope of the present invention.

Unless defined otherwise, all terms (including technical and scientific terms) used in the present specification have the same meaning as meanings commonly understood by those skilled in the art to which the present invention pertains. In addition, terms defined in commonly used dictionary are not ideally or excessively interpreted unless explicitly defined otherwise.

Further, the term "~unit" or "module" used herein means a hardware component such as software, FPGA, or ASIC and performs predetermined functions. However, the term "~unit" or "module" is not limited to software or hardware. The "unit" or "module" may be configured to be stored in a storage medium that can be addressed or may be configured to regenerate one or more processors. Accordingly, for example, the "unit" or "module" includes components such as software components, object-oriented software components, class components, and task components, processors, functions, attributes, procedures, subroutines, segments of a program code, drivers, firmware, a microcode, a circuit, data, a database, data structures, tables, arrays, and variables. Functions provided in components, and the "units" or "modules" may be combined into fewer components, and "units" or "modules" or further separated into additional components, and "units" or "modules".

The spatially relative terms "below", "beneath", "lower", "above", "upper", and the like may be used to easily describe the correlation between one component and other components as illustrated in the drawings. The spatially relative terms should be understood as including different directions of components during use or operation in addition to the directions shown in the drawings. For example, when components shown in the drawings are inverted, a component described as "below" or "beneath" of another component may be disposed "above" another component. Therefore, the illustrative term "below" can include both downward and upward directions. The components can also be aligned in different directions, and therefore the spatially relative terms can be interpreted according to the alignment.

In this specification, a computer means all kinds of hardware devices including at least one processor, and can be understood as including a software configuration which is operated in the corresponding hardware device according to the embodiment. For example, the computer may be understood as a meaning including all of smart phones, tablet PCs, desktops, laptops, and user clients and applications running on each device, but is not limited thereto.

Hereinafter, embodiments of the present invention will be described with reference to the accompanying drawings.

Figure 1:
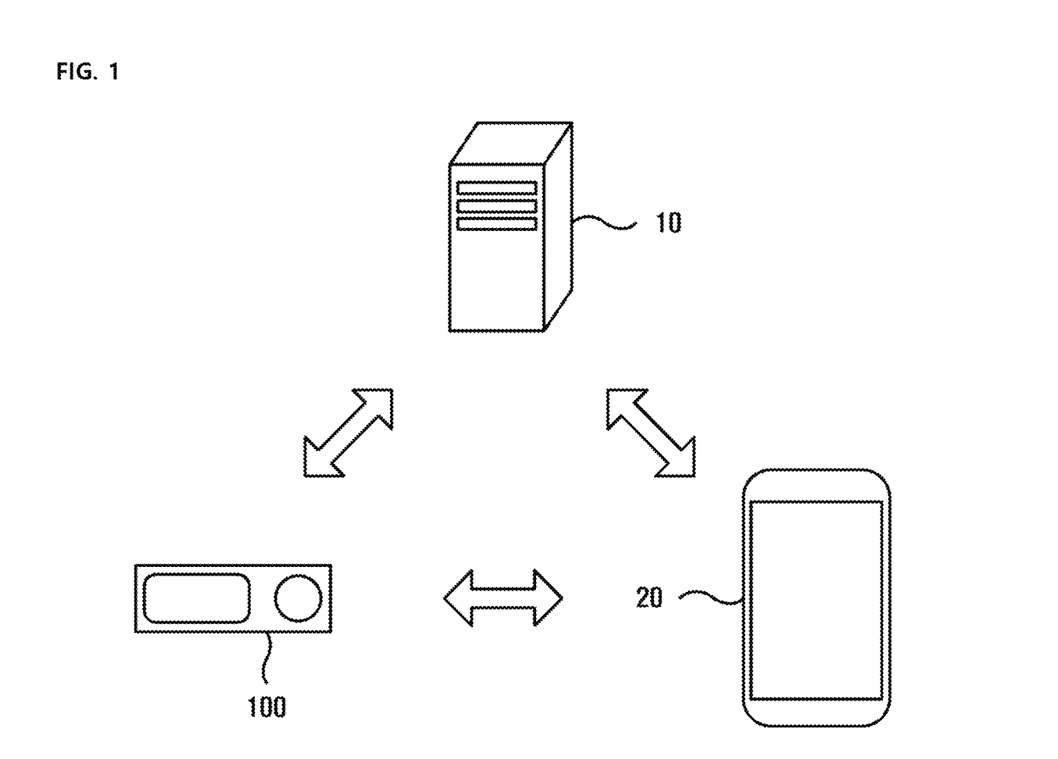
FIG. 1 is a diagram illustrating a system according to an embodiment.

FIG. 1 is a diagram illustrating a system according to an embodiment.

Referring to FIG. 1, a service request device 100, a computer 10 and a user terminal 20 are shown.

In one embodiment, it can be understood that the service request device 100 means all types of devices which are installed at one or more locations where services are provided and are used for a customer to transmit predetermined requests to a service provider.

For example, the service request device 100 may refer to a device which is provided on each table in a restaurant and is used for a user to call a service provider or to transmit predetermined information to the service provider or other entities, but is not limited thereto.

For example, the service request device 100 can be installed and used at various locations such as a karaoke room, a pub, a screen golf course, a bowling alley, and the like, and an installation location thereof is not limited.

In one embodiment, the computer 10 may refer to all types of devices which receive and process information from the service request device 100. According to the embodiment, the computer 10 may include, but is not limited to, a router device which receives and transmits information on the service request device 100.

In one embodiment, the computer 10 may be connected to one or more displays of a service providing location to display a called table number or information corresponding to a call signal, thereby transmitting the information to the service provider.

In one embodiment, the user terminal 20 may refer to a mobile terminal used by a customer or refer to a mobile terminal used by a staff at the service providing location, but is not limited thereto.

For example, the information transmitted from the service request device 100 may be transmitted to the mobile terminal of the staff via the computer 10.

In addition, the information transmitted from the service request device 100 may be transmitted to the customer's mobile terminal. According to the embodiment, the customer may use the mobile terminal to obtain the information from the service request device 100, and may use the mobile terminal to transmit specific information to the service request device 100 or the computer 10.

Hereinafter, the service request device 100 and an operation of the service request device 100 according to the embodiment disclosed with reference to the drawings will be described in detail.

Figure 2:
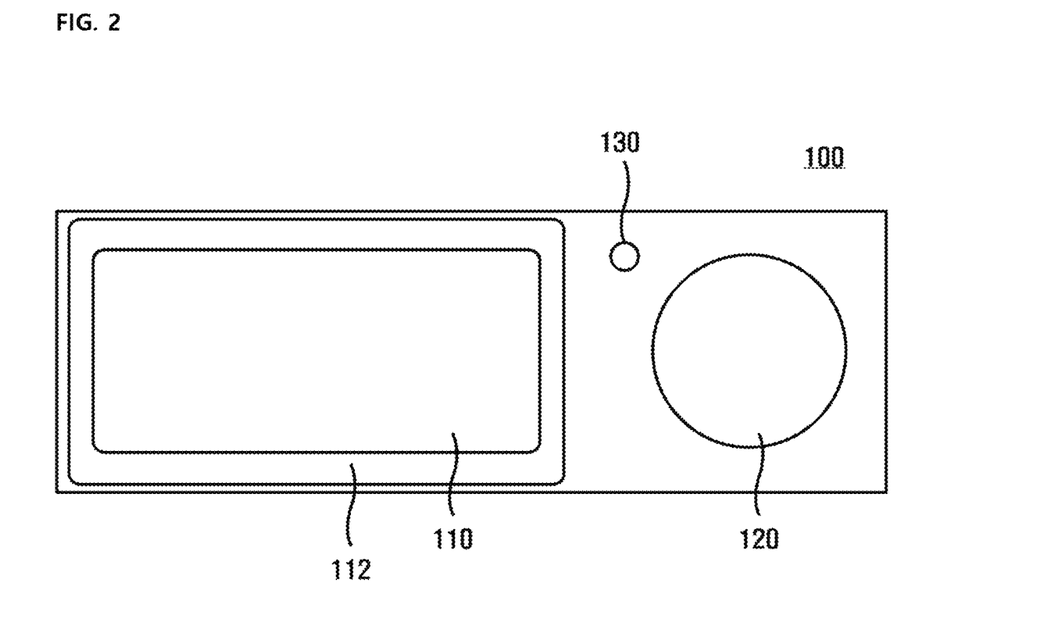
FIG. 2 is a diagram illustrating a service request device according to an embodiment.

FIG. 2 is a diagram illustrating a service request device according to an embodiment.

Referring to FIG. 2, the service request device 100 may include a display 110 and a button 120.

In one embodiment, the display 110 may be a color liquid crystal including an LCD. However, according to the embodiment, the display 110 may be E-paper which can be driven with low power, but is not limited thereto.

Specifically, the display 110 may be implemented as various types of display panels. For example, the display panel may be implemented by various display technologies such as a liquid crystal display (LCD), an organic light emitting diode (OLED), an active-matrix organic light-emitting diode (AM-OLED), a liquid crystal on silicon (LcoS), digital light processing (DLP), an electronic paper display (EPD), and the like.

In addition, the display 110 may also be coupled to at least one of a front area, a side area, and a back area of the service request device 100 in the form of a flexible display. The flexible display can be warped, bent or rolled without damage through a thin, flexible substrate like paper. Such a flexible display may be manufactured using a plastic substrate as well as a commonly used glass substrate. When the plastic substrate is used, the plastic substrate can be formed using a low-temperature manufacturing processor without using the existing manufacturing processor to prevent damage to the substrate. Further, by replacing the glass substrate wrapping the flexible liquid crystal with a plastic film, the plastic substrate may be given flexibility to be folded and unfolded. There is an advantage in that the flexible display is not only thin and light, but also resistant to impact, and can be warped or bent and manufactured in various forms.

In one embodiment, the display 110 may further include a bezel portion 112.

In one embodiment, the bezel portion 112 may display information on a service provider or a company which develops the service request device 100 and the system, but is not limited to displaying the information.

In one embodiment, a button 120 may be configured as a single button but is not limited thereto. Accordingly, the button 120 may include a plurality of buttons, and may be configured to have a single button but perform other inputs according to pressed locations or directions, but the configuration of the button 120 is not limited thereto. Further, the button 120 may include a physical button, an optical key, or a keypad, or may be implemented in the form of a touch panel to which the display 110 and a touch sensor are coupled, but the form of the button 120 is not limited thereto. In this case, the touch sensor may use at least one of a capacitive type, a pressure-sensitive type, an infrared type, and an ultrasonic type. The touch panel may have a function of detecting not only a display function but also a touch input position, a touch area, and a touch input pressure, and also has a function of detecting not only a real-touch but also a proximity touch. In one embodiment, the service request device 100 may further include a light emitting unit 130. For example, the light emitting unit 130 may include at least one LED, but is not limited thereto.

Further, the service request device 100 may further include a communication unit, a memory, an audio processing unit, an audio output unit, and a processor.

The communication unit can perform communication with an external device. In particular, the communication unit may include various communication chips such as a Wi-Fi chip, a Bluetooth chip, a wireless communication chip, an NFC chip, a low-power Bluetooth stick (BLE chip). At this time, the Wi-Fi chip, the Bluetooth chip, and the NFC chip each communicate with each other by an LAN method, a Wi-Fi method, a Bluetooth method, and an NFC method. When the Wi-Fi chip or the Bluetooth chip is used, the Wi-Fi chip or the Bluetooth chip may first transmit and receive various types of connection information such as an SSID and a session key, and perform a communication connection using the connection information and then receive various types of information. The wireless communication chip means a chip which performs communication according to various communication standards such as IEEE, ZigBee, 3rd generation (3G), 3rd generation partnership project (3GPP), and long term evolution (LTE).

The memory may store various programs and data necessary for the operation of the service request device. The memory may be implemented as a non-volatile memory, a volatile memory, a flash memory, a hard disk drive (HDD), a solid state drive (SSD) or the like.

The audio processing unit is a component which performs processing on the audio data. The audio processing unit may perform various kinds of processing such as decoding, amplification, or noise filtering of audio data. Audio data processed by the audio processing unit may be output to the audio output unit.

The audio output unit is configured to output various notification sounds or voice messages as well as output various audio data which are subjected to various processing operations, such as decoding, amplification, and noise filtering, by the audio processing unit. In particular, the audio output unit may be implemented as a speaker, which is merely an example. Therefore, the audio output unit may be implemented as an output terminal which can output audio data.

The processor can control the overall operation of the service request device 100 using various programs stored in the memory.

The processor may be implemented as a RAM, a ROM, a graphics processing unit, a main CPU, first to nth interfaces, and a bus. At this time, the RAM, the ROM, the graphics processing unit, the main CPU, the first to nth interfaces may be connected to each other via the bus.

The RAM stores O/S and application programs. Specifically, when the service request device 100 is booted, the O/S is stored in the RAM, and various application data selected by a user may be stored in the RAM.

The ROM stores a set of instructions and the like for booting a system. When the turn-on command is input and power is supplied, the main CPU copies the O/S stored in the memory 150 to the RAM according to the instructions stored in the ROM, and executes the O/S to boot the system. When the booting is completed, the main CPU copies various application programs stored in the memory to the RAM, executes the application programs copied to the RAM, and performs various operations.

The graphics processing unit generates a screen including various objects such as an item, an image, and a text using an arithmetic unit (not illustrated) and a rendering unit (not illustrated). Here, the arithmetic unit may be configured to calculate attribute values such as coordinate values, shapes, sizes, and colors to be displayed by each object according to a layout of the screen using a control command received from the input unit. The rendering unit may be configured to generate screens of various layouts including objects based on the attribute values calculated by the arithmetic unit. The screen generated by the rendering unit may be displayed in a display area of the display 110.

The main CPU accesses the memory and performs the booting using the OS stored in the memory. The main CPU performs various operations using various programs, contents, and data stored in the memory.

The first to nth interfaces are connected to various components described above. One of the first to nth interfaces may be a network interface connected to an external device via a network.

In one embodiment, the light emitting unit 130 may be configured to display whether the network of the service request device 100 is connected (for example, whether or not a Wi-Fi network is connected) and whether requests transmitted through the service request device 100 are transmitted and received (accepted).

In one embodiment, the display 110 may display various types of information. For example, the display 110 may display each table number. According to the embodiment, the display 110 displays a waiting number depending on a call or a menu order.

For example, when an input is received through the button 120, the service request device 100 may transmit a call signal to the computer 10 and receive, from the computer 10, information on the waiting number depending on a call.

For example, when a call signal is received from a plurality of tables, the computer 10 sorts the call signal based on a call time, and a staff first visits a table from which the call signal was received. After a staff visits each table, the staff can complete visit processing for the corresponding table using a staff terminal. For example, the staff can complete the visit processing for the corresponding table by performing a predetermined input at the staff terminal. In one embodiment, the completion input can be made only when the staff terminal is located within a predetermined distance from the service request device of the corresponding table, the completion input can be made only when the staff contacts its own terminal with the service request device using NFC, or the completion input may be automatically made when the staff terminal is located within a predetermined distance from the service request device using RF or Bluetooth.

In this case, the completion input may be automatically made when the staff terminal is located for a predetermined time or more within a predetermined distance from the service request device so that the completion processing is not made while the staff simply passes by.

In this manner, the computer 10 can assign a waiting sequence number to each table based on the number of tables called in real time and the number of processed calls, and the waiting sequence number can be displayed on the service request device 100.

In this case, customers of each table can confirm the waiting sequence number and its processing through the display 110 of the service request device 100, so the customers repeatedly press the button 120 of the service request device 100, do not need to confirm whether or not a call is normally made, or the like.

According to the embodiment, when order information is input after a call, the computer 10 may transmit the information to the service request device 100 of the corresponding table. In this case, the transmitted order information may be displayed on the display 110 of the service request device 100. In this case, a customer can check whether or not an order is normally accepted according to the information displayed on the display 110.

In addition, the information on a waiting order, an estimated completion time or the like of each order can be transmitted from the computer 10 to the service request device 100 in real time, and the display 110 of the service request device 100 displays the related information in real time, so the information can be transmitted to the user.

In one embodiment, the light emitting unit 130 may also display feedback information as described above. For example, different information may be displayed based on a light emission time, the number of times of blinking, a speed, a light emission color and the like of the light emitting unit 130, but the present invention is not limited thereto.

The display 110 may display each piece of information directly or may display means for accessing information according to the embodiment. For example, the display 110 may display an electronic code such as a QR code and may display link information. According to the embodiment, the service request device 100 may directly transmit information to the user terminal using short range wireless communication, and the specific method thereof is not limited.

In addition, the display 110 may display promotion information or related advertisement information in the store. For example, information on a sale event or an event menu of the store, information on a discounted product, advertisement information thereon and the like may be displayed.

In one embodiment, the service request device 100 may not only provide advertising information, but also generate a call signal corresponding to the advertisement information based on an interaction with a user through the button 120 and transmit the generated call signal to the computer 10.

In one embodiment, the service request device 100 may transmit information to the store's computer 10 based on Wi-Fi, Bluetooth, RF, wired and wireless networks, mobile networks, and other short range wireless communications, and the specific method thereof is not limited.

Similarly, the service request device 100 receives information from an external terminal based on at least one of the methods described above, and may display the received information on the display 110.

The screens and contents displayed on each display 110, and the configuration of the button 120 and the interaction method with the user are not limited, and the details thereof will be described below with reference to the drawings.

Figure 3:
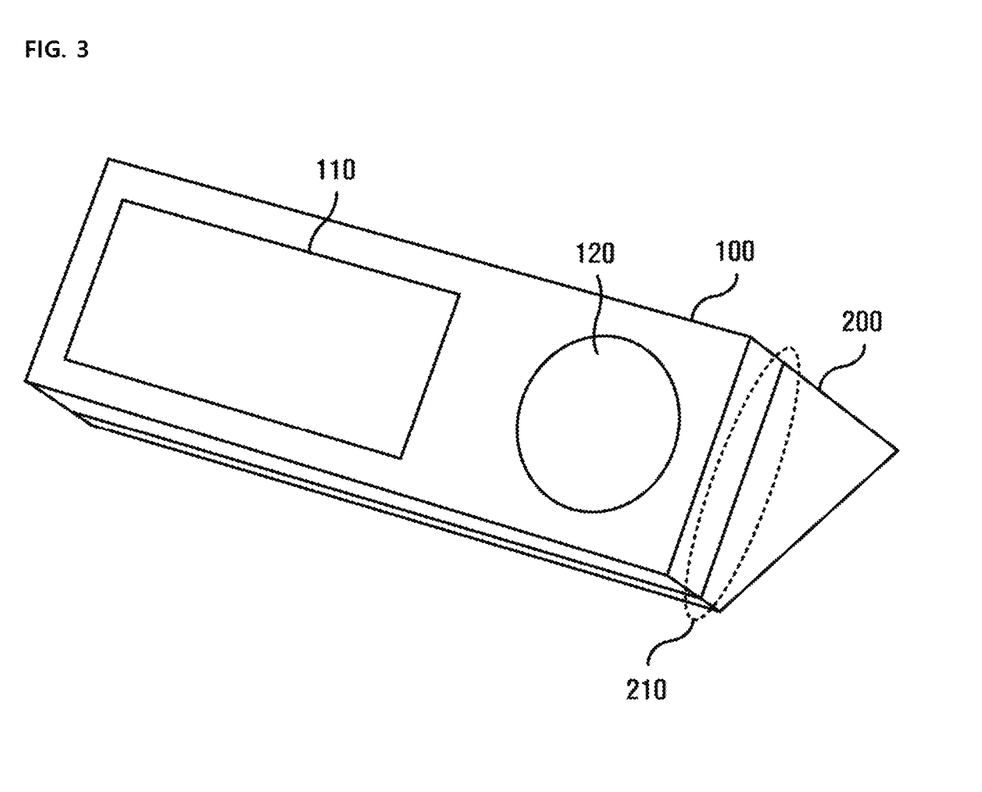
FIG. 3 is a diagram illustrating the service request device including a stand according to the embodiment.

FIG. 3 is a diagram illustrating a service request device including a stand according to an embodiment.

FIG. 3 illustrates the service request device 100 and a stand 200 on which the service request device 100 is mounted.

For example, the stand 200 is provided on each table, and the service request device 100 may be used by being coupled to or mounted on the stand 200.

According to the embodiment, the service request device 100 and the stand 200 may be integrally configured or coupled to each other or detachably coupled from each other, and the service request device 100 may be simply mounted on or lays over the stand 200.

A connection unit 210 between the stand 200 and the service request device 100 illustrated in FIG. 3 may be configured in various structures according to the respective forms, and the shape shown in FIG. 3 is merely disclosed as an example. According to the embodiment, the service request device 100 alone may be configured in a table mountable shape without a separate stand 200.

For example, the connection unit 210 may be provided with at least one protrusion or groove for fixing the service request device 100 and the stand 200. According to the embodiment, the connection unit 210 may be provided with a velcro, a button, a friction part and the like, and may be configured in a wave shape or a sawtooth shape to assist the connection between the service request device 100 and the stand 200, but the present invention is not limited thereto.

Figure 4:
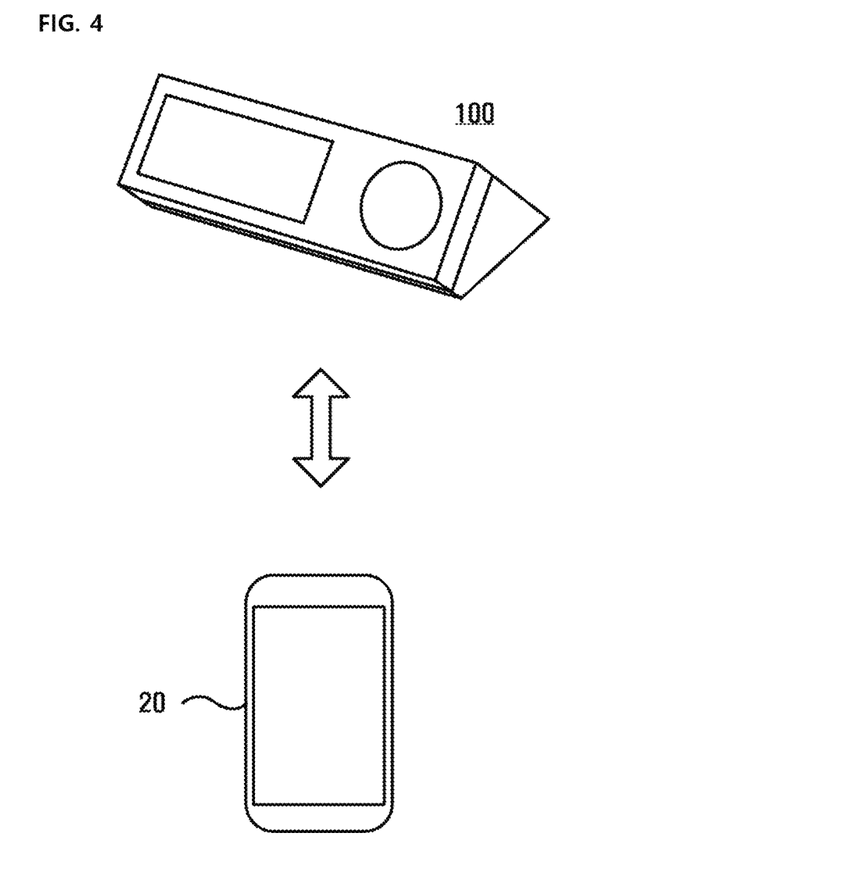
FIG. 4 is a diagram illustrating an interaction between a service request device according to the embodiment and a user terminal.

FIG. 4 is a diagram illustrating an interaction between a service request device according to the embodiment and a user terminal.

In one embodiment, the service request device 100 and the user terminal 20 may communicate with each other or exchange information with each other to perform the interaction.

As an example, the user terminal 20 may photograph information displayed on the service request device 100 to acquire information. For example, the user terminal 20 may photograph an electronic code displayed on the display of the service request device 100 to acquire information corresponding to the photographed electronic code.

As another example, the user terminal 20 may perform communication based on the short range wireless communication with the service request device 100. For example, the user terminal 20 may perform communication with the service request device 100 based on the NFC or the Bluetooth, but is not limited thereto.

In one embodiment, the call signal may be transmitted by the service request device 100 and may also be transmitted by the user terminal 20.

For example, when an input of a user for a button of the service request device 100 is received, the service request device 100 may transmit a signal corresponding to the button input to the computer 10.

In addition, when the user terminal 20 displays callable information based on the information acquired from the service request device 100, and when the user selects at least one of the displayed information, the call signal corresponding to the selected information may be transmitted to the computer 10.

In this case, the call signal may also generated when the call signal is repeatedly transmitted on both terminals.

In this case, when the computer 10 receives signals from the service request device 100 on the same table and the user terminal 20 corresponding thereto within a predetermined time interval, the computer 10 compares contents of the two signals to omit the duplicated content and merge the contents, and thus may generate one call signal and transmit information on the generated call signal to the staff terminal.

Figure 5:
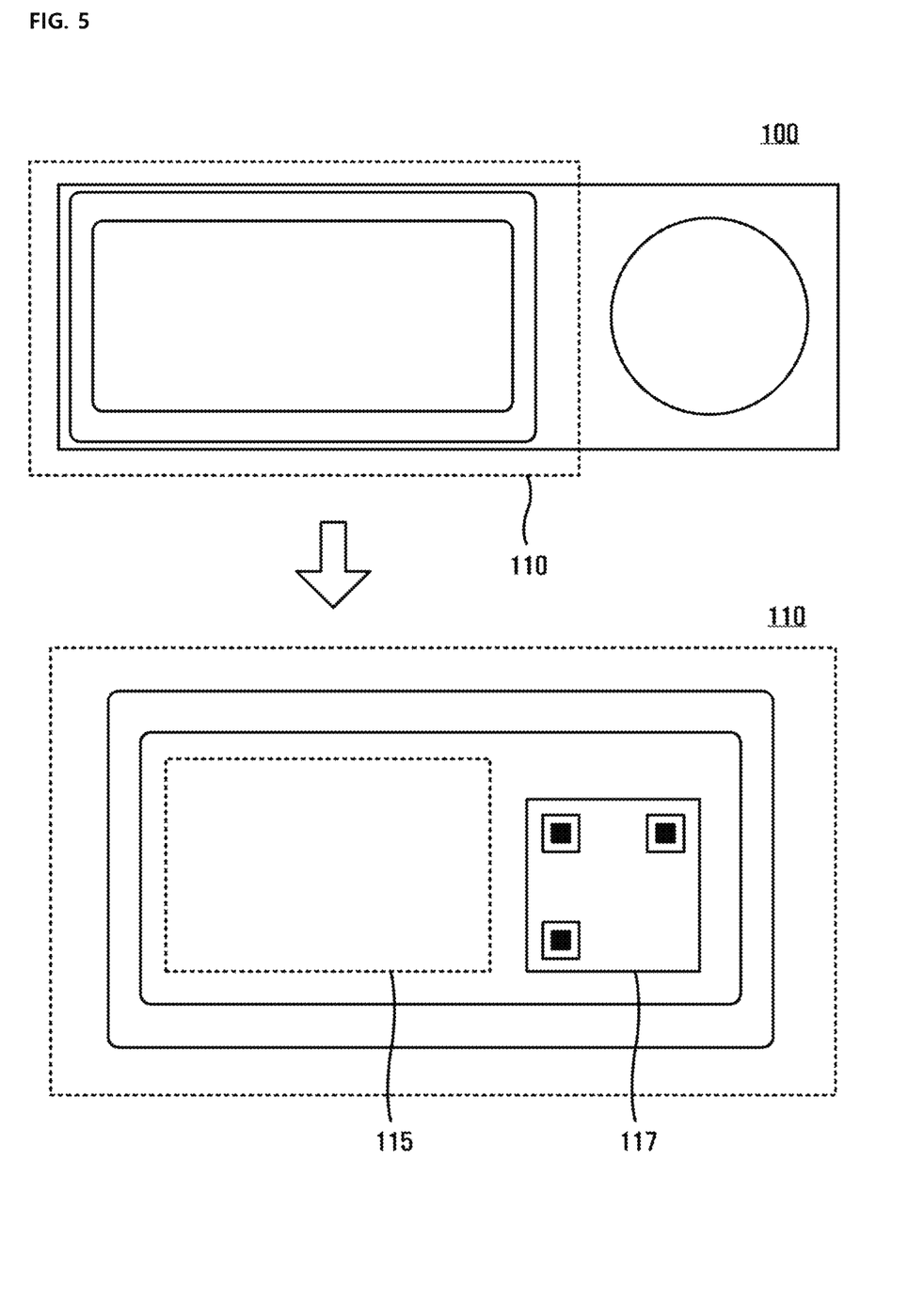
FIG. 5 is a diagram illustrating a display of the service request device according to the embodiment.

FIG. 5 is a diagram illustrating a display of the service request device according to the embodiment.

FIG. 5 shows an example of the display 110 of the service request device 100.

For example, the display 110 may include an information display unit 115 which displays information and an electronic code display unit 117 which displays an electronic code.

For example, a QR code may be displayed on the electronic code display unit 117, and information corresponding to the QR code may be displayed on the information display unit 115.

For example, when an advertisement for a specific product is displayed on the information display unit 115, the electronic code display unit 117 may display a QR code linked to a URL which can obtain specific information on the advertisement displayed on the information display unit 115 and display a QR code linked to a URL which can purchase or order a product to be advertised.

For example, information on a menu being discounted at a specific restaurant may be displayed on the information display unit 115, and when a user photographs a QR code displayed on the electronic code display unit 117, a screen which can order the corresponding menu is displayed on the user terminal 20, and when an input to an order button is received by the user terminal 20, the user terminal 20 may transmit a call including the order information to the service request device 100 or the computer 10.

In addition, when a description of the restaurant or a representative menu is displayed on the information display unit 115 and the user terminal 20 photographs the QR code displayed on the electronic code display unit 117, the overall menu information of the restaurant may be displayed on the user terminal 20, and the user may place an order based on the displayed menu information.

In one embodiment, when the user performs an input to the button 120 of the service request device 100, information on an orderable menu and a QR code corresponding to the information may be displayed on the display 110.

In this case, when a user acquires the menu information using the QR code, selects a menu through the user terminal 20, and then presses the button 120 of the service request device 100 again, the call information may be transmitted to the computer 10 together with the information on the menu selected by the user.

In this case, the QR code may be displayed only for a predetermined time after the user performs the input to the button 120 of the service request device 100, so a re-input time to the button 120 for ordering may also be restricted to a predetermined time.

In one embodiment, the service request device 100 may maintain a time synchronization state with the server or the computer 10 using a real time clock (RTC). The real time clock (RTC) is a component for maintaining a time even when a module of a digital circuit for maintaining the current time of the service request device 100 and the service request device 100 are powered off. The RTC may be configured as a digital circuit which counts the time of day, hour, minute, second, and the like, and may include a separate battery for supplying power using a battery even when the service request device 100 is powered off. The RTC can be DS12C887 or DS1307 manufactured by Dallass Co., but is not limited thereto.

Accordingly, the service request device 100 may change the shape of the QR code displayed on the electronic code display unit 117 of the display 110 every predetermined time interval, and change the URL linked thereto.

Therefore, when the user photographs the QR code, the server can verify the integrity of the QR code by comparing the time when the QR code is photographed, the captured QR code, and the photographed QR code, and the URL connected thereto.

Through this, the server can verify that the user has actually photographed the QR code displayed on the service request device 100 provided on the table in the current restaurant table.

Through this, it is possible to block the possibility of attack such as disturbing the system inside the restaurant through the connection outside the restaurant.

In one embodiment, the QR code may be newly generated every a predetermined time, or may be newly generated each time the user terminal 20 photographs the QR code and is connected to the URL corresponding to the photographed QR code. According to the embodiment, as described above, a QR code corresponding to an input time may be generated and displayed each time the input to the button 120 by the user is received.

The QR code generated by the above methods and the URL corresponding thereto can be verified by the server, and the time of the service request device 100 and the server is kept synchronized. Therefore, the server may verify each QR code based on information on algorithm used by each service request device and information on the time when each QR code is generated.

In one embodiment, the QR code may be verified based on the location of the user terminal 20. For example, the server may determine the location of the user terminal 20 and allow URL access corresponding to the QR code only if the user terminal 20 is determined to be located within a store. For example, the server may use a GPS signal of the user terminal 20, but may determine a location of a user terminal 20 using an indoor positioning method based on a Wi-Fi AP signal or a Bluetooth signal.

To this end, the service request device 100 according to the disclosed embodiment can send out a wireless signal (for example, a Bluetooth signal). The user terminal 20 can acquire the information on the service request device 100 and information on signal strength from the wireless signal received from the service request device 100, and the server may verify the location of the user terminal 20 based on the corresponding information.

In addition, the service request device 100 may receive the wireless signal from the user terminal 20 and transmit information on the received signal to the server. The server can determine the location of the user terminal 20 based on the signal information.

In one embodiment, the electronic code displayed on the electronic code display unit 117 may be used for payment. For example, when the user intends to settle an amount used in the store where the service request device 100 is installed, the user photographs the electronic code displayed on the electronic code display unit 117 using the user terminal 20 to perform payment.

In this case, a description of a payment means corresponding to the electronic code displayed on the electronic code display unit 117 may be displayed on the information display unit 115.

In one embodiment, the user can control the service request device 100 to change the payment means using the button 120 or to display the payment means.

For example, when the user presses the button 120 once, any payment means is displayed and the payment means displayed on the display 110 can be changed each time the user presses the button 120.

In one embodiment, the operation of the service request device 100 may be configured differently depending on how to press the button 120. For example, if the user presses the button 120 once briefly, the call signal may be transmitted, and if the user presses the button 120 for a predetermined time or more, the payment means may be displayed on the display 110 or the displayed payment means may be changed, but the present invention is not limited thereto.

Figure 6:
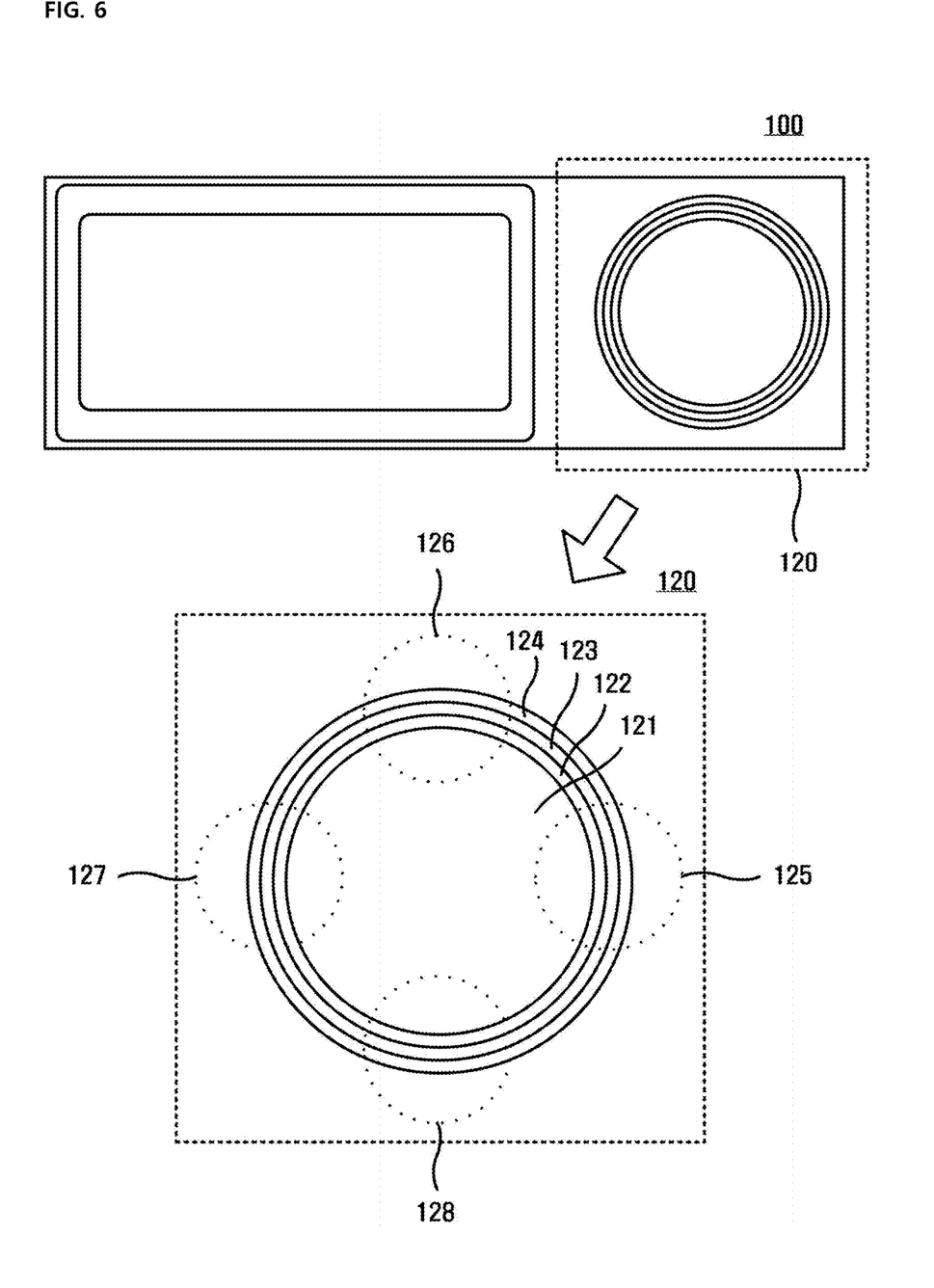
FIG. 6 is a diagram illustrating in detail a button of the service request device according to the embodiment.

A specific method for recognizing different functions depending on how to press the button will be described below with reference to the drawings FIG. 6 is a diagram illustrating in detail a button of the service request device according to the embodiment.

In one embodiment, the button 120 of the service request device 100 may be configured as a single button. In this case, the number of input methods by the button 120 may be limited to one, but various inputs may be received based on time, the number of times, an interval, a location, and intensity of the button 120.

For example, as illustrated in FIG. 6, the button 120 is configured as a single button, and a specific input region thereof may include a plurality of input regions 125 to 128. The type and number of the input regions 125 to 128 are not limited.

Each of the input regions may perform different functions depending on the content displayed on the display 110. According to the embodiment, the content displayed on the display 110 may be changed based on the location where the input region is pressed, and a call signal corresponding to the changed content can be transmitted to the computer 10 according to the input to the button 120.

In one embodiment, the button 120 may further include one or more sensing units 120 to 124.

Sensing units 122 to 124 may be used to detect the information on the input of the user to the button 120.

Figure 7:
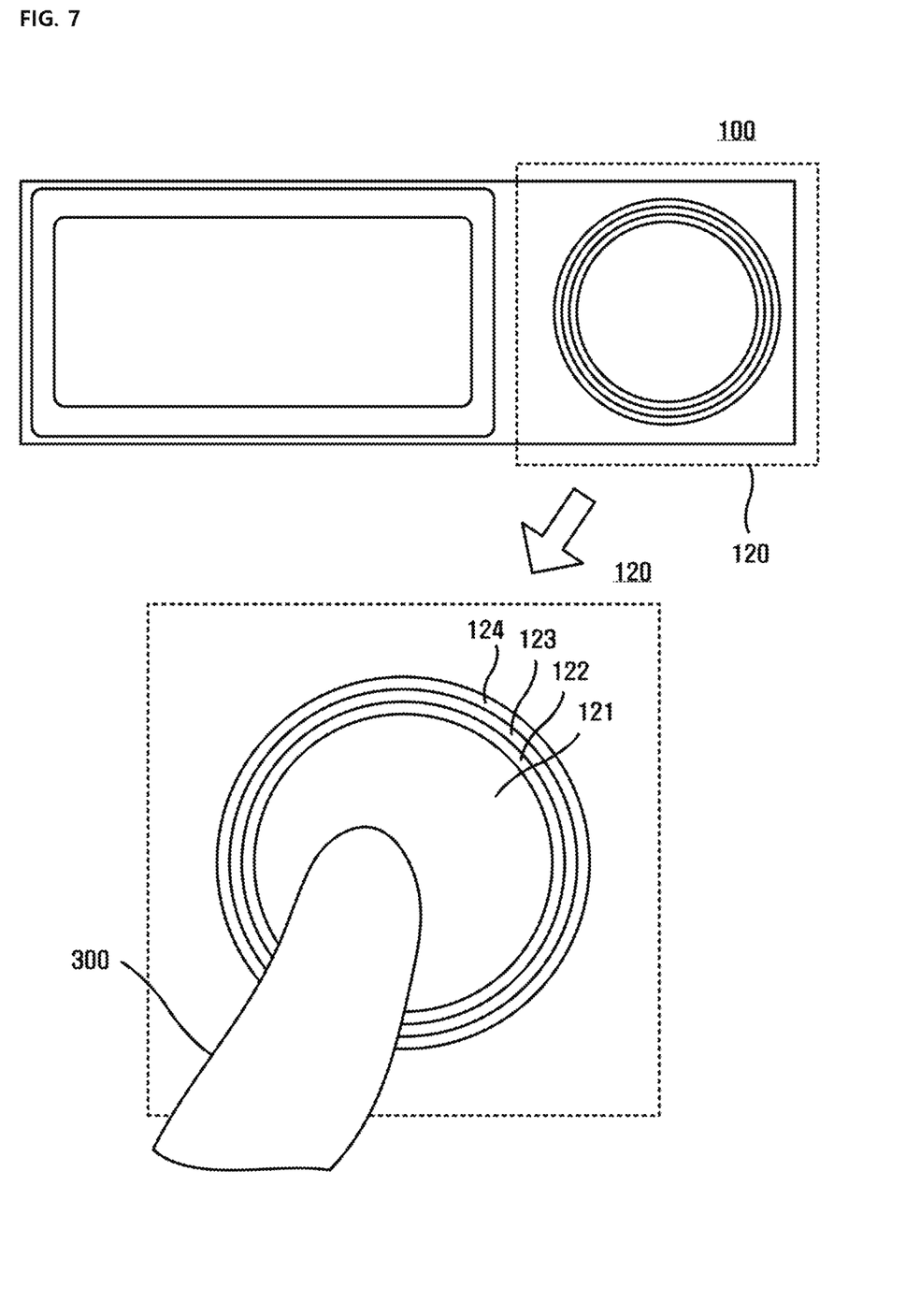
FIG. 7 is a diagram for describing in detail a sensing unit according to an embodiment.

FIG. 7 is a diagram for describing in detail a sensing unit according to an embodiment.

FIG. 7 illustrates an example in which a user's finger 300 presses the button 120.

The sensing units 122 to 124 may be configured to have various members and structures, and may also include various sensors.

For example, the sensing units 122 to 124 may include at least one pressure sensor, and may also be configured as a stretchable member which can be deformed according to pressure.

For example, when a user presses a center 121 of the button 120, the button 120 is pressed by a pressing force, and the sensing units 122 to 124 are gradually depressed during the pressing.

In this case, each of the sensing units 122 to 124 may measure the pressure of the finger 300 pressing the button 120 based on the depressed state of each of the sensing units 122 to 124 and the pressure detected by each of the sensing units 122 to 124.

For example, the sensing unit 122, the sensing unit 123, and the sensing unit 124 may be sequentially depressed depending on a force pressing the center 121 of the button 120.

The service request device 100 may determine that the input to the button 120 is performed at first strength when the depression occurs only in the center 121, second intensity when the depression occurs up to the sensing unit 122, third intensity when the depression occurs up to the sensing unit 123, fourth strength 120 when the depression occurs up to the sensing unit 124, and may further subdivide and detect each step based on the pressure detected by each sensing unit 122 to 124.

In one embodiment, the service request device 100 may recognize different inputs based on the strength sensed at the button 120.

In one embodiment, each of the sensing units 122 to 124 may include a touch sensor.

In this case, the touch input may be detected over the entire sensing units 122 to 124 depending on the area where the user's finger 300 is in contact with the button 120, and the touch input may not be detected anywhere.

The service request device 100 may recognize different inputs based on the number and type of sensing units, which detect the touch input, among the sensing units 122 to 124.

For example, as more touch inputs are detected by the sensing units 122 to 124 or the button 120 is input with a stronger pressure as described above, it may be estimated that the user inputs the button 120 with an urgent or bad feeling. In this case, a signal which makes a priority of a call signal higher than other call signals can be transmitted together with the call signal.

In this case, the call signal may be preferentially displayed to other call signals, so the staff may preferentially correspond to the call signal.

In one embodiment, the service request device 100 may automatically determine the type of call or display candidate types when the input to the button 120 is received.

For example, if a user orders Soju just before, when he/she presses the service request device again, he or she may wish to order additional Soju. In this case, the service request device 100 can automatically transmit a call signal which reorders the menu that the user orders just before. In one embodiment, the service request device 100 may review the type of menu that the user orders just before.

For example, the service request device 100 may have a database in which types of menus are classified and stored, and the types of menus may be classified based on a possibility of reordering.

For example, it may be categorized as a category with a low possibility of reordering for a meal menu, and a category with a high possibility of reordering for alcoholic liquors or a drink.

Accordingly, when the input to the service request device 100 is received, the service request device 100 confirms a menu that a user orders just before. If the just before ordered menu is classified into a category with a high possibility of reordering, the service request device 100 may automatically order the corresponding ordering menu or display a query including the corresponding ordering menu.

For example, when the button input to the service request device 100 is received, the service request device 100 may display a written announcement "Do you want to order Soju" on the display 110 if the just before ordered menu is Soju. At this time, if the user presses the button 120 again, the call signal including the information ordering Soju may be transmitted, and if the user does not press the button 120, a general call signal may be transmitted.

For example, the call signal is waiting without being transmitted, and the general call signal can be automatically transmitted if no button input is received for a predetermined time.

As another example, when the first button is pressed, the call signal is transmitted, and when the button is again pressed within a predetermined time, a call signal ordering Soju is additionally transmitted. The computer 10 may merge the call signals transmitted within a predetermined interval to generate the call information ordering Soju in the corresponding table, and may transmit the generated information to the staff terminal.

Alternatively, the service request device 100 may select one or more ordering menus belonging to the category with the high possibility of reordering among the previously ordered menus other than the just before ordered menu, and display the reordering query of the selected ordering menu on the display.

On the other hand, according to various embodiments of the present invention, the service request device may perform various functions. In one embodiment, the processor can control the display 110 to receive an image to be displayed on the information display unit 115, from an external server through the communication unit and display the received image. At this time, the received image may be at least one image related to in-store advertisement such as announcements, events, and promotions.

In another embodiment, the processor may determine the set value of the service request device at a predetermined time interval, receive a set value instruction of the service request device, and change the setting of the service request device based on the received instruction.

In another embodiment, it goes without saying that the processor may upload the information (state of charge of a battery, and the like) of the service request device 100 or perform firmware over the air (FOTA).

Figure 8:
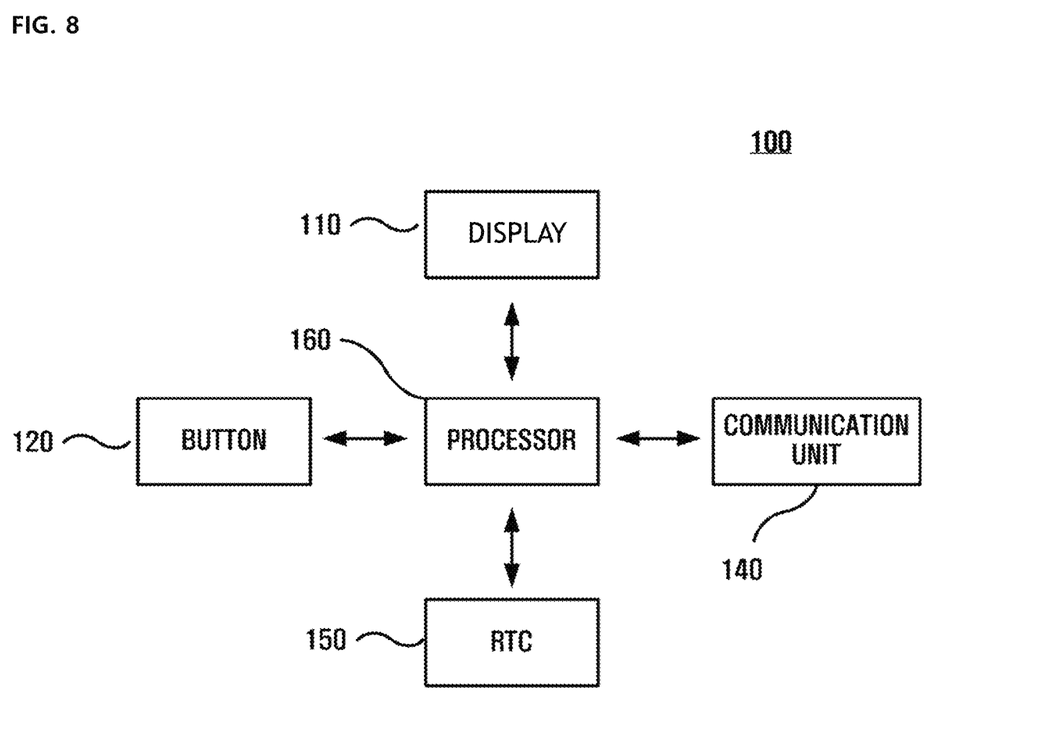
FIG. 8 is a block diagram illustrating a configuration of a service request device according to an embodiment of the present invention.

FIG. 8 is a block diagram illustrating a configuration of a service request device according to an embodiment of the present invention.

As illustrated in FIG. 8, the service request device 100 may include the display 110, the button 120, the communication unit 140, the RTC 150, and the processor 160. The configuration and function of the display 110, the button 120, the communication unit 140, the RTC 150, and the processor 160 are described above, and the detailed description thereof will be omitted. Steps of the method or algorithm described with reference to the embodiment of the present invention may be directly implemented in hardware, in software modules executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in any form of computer readable recording medium known in the art to which the invention pertains.

The components of the present invention may be embodied as a program (or application) and stored in a medium for execution in combination with a computer which is hardware. The components of the present invention may be executed in software programming or software elements, and similarly, embodiments may in programming or scripting language such as C, C++, Java, and assembler, including various algorithms implemented in a combination of data structures, processes, routines, or other programming constructions. Functional aspects may be implemented in algorithms executed on one or more processors.

Although the embodiments of the present invention has been described with reference to the accompanying drawings, those skilled in the art will appreciate that various modifications and alterations may be made without departing from the spirit or essential feature of the present invention. Therefore, it should be understood that the above-mentioned embodiments are not restrictive but are exemplary in all aspects.

According to the disclosed embodiment provide a service request device capable of providing various types of information and facilitating a user's call.

Effects of the present invention are not limited to the above-mentioned effects, and other effects that are not mentioned will be clearly understood by those skilled in the art from the following descriptions.

What is claimed is:

1. A service request device, comprising:
    a display including a first section displaying information and a second section displaying an electronic code;
    a button receiving an input;
    a real time clock (RTC); and
    a processor,
    wherein the processor is configured to:
    in response to the input received by the button, transmit a call signal corresponding to at least one of the input, the information displayed on the first section of the display, and the electronic code displayed on the second section of the display,
    perform time synchronization with an external server based on the RTC, and
    generate the electronic code at a predetermined time interval based on the synchronized time information,
    wherein the second section of the display is configured to display a Quick Response (QR) code, the first section of the display is configured to display the information associated with the QR code, the service request device is configured to periodically change the QR code displayed on the second section of the display according to the RTC and change a uniform resource locator (URL) linked to the changed QR code, and the external server is configured to authenticate the QR code captured by a user device.

2. The service request device of claim 1, wherein the processor is configured to regenerate and display the electronic code when photographing information of the electronic code is received.

3. The service request device of claim 1, wherein the display is configured to display, on the second section of the display, the electronic code including link information corresponding to the information displayed on the first section of the display.

4. The service request device of claim 1, wherein the display is configured to display an electronic code corresponding to a predetermined payment system on the second section of the display and display information associated with the payment system on the first section of the display.

5. The service request device of claim 1, wherein the button includes a plurality of input regions and a plurality of sensors, and
the processor is configured to determine a location, a range, and strength where the button is pressed based on the plurality of input regions and the plurality of sensor units and generates different call signals using the determination result.

6. The service request device of claim 5, wherein the processor is configured to:
determine the strength where the button is pressed as first strength to fourth strength using the plurality of sensors,
determine urgency of the call signal based on the determined strength, and
transmit the call signal including information on the determined urgency.

7. The service request device of claim 1, further comprising at least one light emitting unit,
wherein the processor is configured to perform control to receive a feedback signal corresponding to the transmitted call signal and display a light emission signal corresponding to the feedback signal through the light emitting unit.

8. The service request device of claim 1, further comprising a communication unit configured to communicate with a computer, a user terminal, and an external server using at least one of low power Bluetooth communication and Wi-Fi communication,
wherein:
the processor is configured to control the display to receive an image to be displayed on the first section of the display from the external server through the communication unit and display the received image, and
the image comprises at least one of in-store advertisement of announcement, event, and promotion.

9. The service request device of claim 8, wherein the processor is configured to determine a set value of the service request device at a predetermined time interval, receive a set value instruction of the service request device, and change setting of the service request device based the received instruction.

10. The service request device of claim 1, wherein the external server is configured to authenticate the QR code captured by the user device based on a location of the user device capturing the QR code.

11. The service request device of claim 1, wherein the external server is configured to authenticate the QR code captured by the user device based on a time of capturing the QR code by the user device.

12. A service request device, comprising:
a display including a first section displaying information and a second section displaying an electronic code;
a button receiving an input;
a real time clock (RTC); and
a processor,
wherein the processor is configured to:
in response to the input received by the button, transmit a call signal corresponding to at least one of the input, the information displayed on the first section of the display, and the electronic code displayed on the second section of the display,
perform time synchronization with an external server based on the RTC, and
generate the electronic code at a predetermined time interval based on the synchronized time information,
wherein the processor is configured to acquire information on a previous order menu of the user, acquire information on at least one ordering menu belonging to a first category among the previous ordering menus based on a database, display a message querying whether to reorder the at least one ordering menu on the display when an input of a user to the button is received, and transmits a call signal including reordering information of the at least one ordering menu when a re-input of the user to the button is received within a predetermined time, and
the database includes information classifying a plurality of ordering menus into a plurality of categories, and the plurality of categories includes a first category in which a possibility of reordering is equal to or greater than a predetermined reference value and a second category in which a possibility of reordering is equal to or smaller than a predetermined reference value.

* * * * *